(12) United States Patent
Abbaszadeh et al.

(10) Patent No.: US 7,953,781 B1
(45) Date of Patent: May 31, 2011

(54) SYSTEM AND METHOD FOR MEMORY-BASED PARALLEL PN GENERATION

(75) Inventors: Ayyoob Abbaszadeh, Salt Lake City, UT (US); Altaf Rahman, Salt Lake City, UT (US); Merle Keller, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 1036 days.

(21) Appl. No.: 11/754,922

(22) Filed: May 29, 2007

(51) Int. Cl.
*G06F 7/58* (2006.01)
(52) U.S. Cl. ....................................... 708/250
(58) Field of Classification Search ................. None
See application file for complete search history.

(56) References Cited

U.S. PATENT DOCUMENTS

| | | | | |
|---|---|---|---|---|
| 6,072,823 | A * | 6/2000 | Takakusaki | 375/130 |
| 6,556,618 | B1 * | 4/2003 | Morsberger et al. | 375/146 |
| 6,640,236 | B1 | 10/2003 | Lupin et al. | |
| 7,421,463 | B2 * | 9/2008 | Umeno | 708/250 |
| 7,512,645 | B2 * | 3/2009 | Pitz et al. | 708/250 |
| 7,613,757 | B1 * | 11/2009 | Abbaszadeh et al. | 708/250 |
| 2001/0003530 | A1 | 6/2001 | Sriram et al. | |
| 2003/0122697 | A1 | 7/2003 | Schooler et al. | |
| 2008/0219327 | A1 * | 9/2008 | Rushanan | 375/146 |

OTHER PUBLICATIONS

"Gold Code Generator Reference Design", Altera Corpororation, Mar. 2003, pp. 1-16, Version 1.0, Application Note 295.

* cited by examiner

*Primary Examiner* — David H Malzahn
(74) *Attorney, Agent, or Firm* — Kirton & McConkie; William T. Ralston (57) ABSTRACT

A system and method for parallel Pseudo-random Noise (PN) code generation is disclosed. The method includes the operation of producing a PN code sequence having a predetermined length. The PN code can be divided into L segments. At least one of the L segments can have a length less than other segments. The L segments can be distributed into an array of L digital memories. Each of the digital memories can output every Lth chip of the PN code in parallel at a selected rate. An element of the PN code can be substituted from an element substitution cache into the output of the L digital memories to compensate for segment(s) having a shorter length.

20 Claims, 10 Drawing Sheets

SYSTEM AND METHOD FOR MEMORY-BASED PARALLEL PN GENERATION

BACKGROUND

A Pseudo-random Noise (PN) code sequence is a binary sequence that repeats itself after a large number of cycles. Thus, the binary numbers in the sequence are not truly random, but if the repetition cycle of the sequence is long enough, its spectrum shares many of the properties of random electromagnetic noise. PN codes have a variety of uses in modern electronics. They are used in everything from GPS receivers to spread spectrum handsets in wireless and cellular phones.

As the speed and bandwidth of communication devices have increased, it has become necessary to generate the PN codes at an ever increasing speed. When PN codes are used in spread spectrum systems, the PN code is typically generated at a speed several times greater than the bandwidth of the signal. The speed of the PN code is related to the amount of data transmitted on a signal. However, the speed of the hardware used to generate certain types of PN codes has not kept up with the speed of other areas in a communications device. For example, a communications device may be designed to transmit and receive a signal having a bandwidth of 800 MHz in BPSK modulation. A PN code is typically generated at a rate substantially higher than the modulated signal. Generating a PN code at this rate can be extremely challenging.

Standard PN generators typically advance one state of a PN sequence every clock cycle. Thus, a bottleneck may occur in spread spectrum communication devices due to the low speed of the PN code generation circuitry relative to the speed of the communications device.

One method for increasing the speed of PN code production is to use several PN code generators in parallel. By placing four PN code generators in parallel, it may be possible to generate a PN code up to four times as fast. However, due to the nature of the PN code, it is desirable to be able to alter the generated code in a number of ways. For example, in order to synchronize a PN code on an incoming signal with a PN code generated at the receiver, the PN code at the receiver may be delayed for a predetermined number of chips. Simply combining multiple PN generators together to generate PN codes at an increased rate can severely limit the usefulness and flexibility of the parallel generated PN code. For instance, a PN generator comprised of four PN generators multiplexed together cannot be delayed by any predetermined number of chips by simply delaying each of the PN generators by ¼ of the predetermined delay.

SUMMARY

A system and method for parallel Pseudo-random Noise (PN) code generation is disclosed. The method includes the operation of producing a PN code sequence having a predetermined length. The PN code can be divided into L segments. At least one of the L segments can have a length less than other segments. The L segments can be distributed into an array of L digital memories. Each of the digital memories can output every Lth chip of the PN code in parallel at a selected rate. An element of the PN code can be substituted from an element-substitution cache into the output of the L digital memories to compensate for segment(s) having a shorter length.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before a signal carrying information can be transmitted in an electronic format, the information signal is typically converted to a sinusoidal waveform using bandpass modulation. Bandpass modulation can be either digital or analog. For digital modulation, a sinusoid of duration T is referred to as a digital symbol. The sinusoid has three features that can be used to distinguish it from other sinusoids: amplitude, frequency, and phase. Thus, the bandpass modulation can be defined as the process whereby the amplitude, frequency, or phase of a carrier signal (or a combination of them) can be varied in accordance with the information to be transmitted.

For example, phase shift keying (PSK) can be accomplished by varying the phase of the carrier signal according to the equation $$s_i(t) = \sqrt{\frac{2E}{T}} \cos[\omega_o t + \phi_i(t)] \quad 0 \leq t \leq T \quad i = 1, \ldots, M$$

Where $\omega_o$ is the radian frequency of the carrier, E is the energy in joules of the carrier per T seconds, and the phase term $\phi_i(t)$ has M discrete values, typically given by $$\phi_i(t) = \frac{2\pi i}{M} \quad i = 1, \ldots, M$$

Once the signal has been modulated onto the carrier signal, the modulated carrier signal can then be spread using a PN code. The PN code is comprised of a pseudo random digital signal. The PN code is designed to simulate random noise, but unlike real noise, the PN code repeats after a specified interval, making it a pseudo random signal. The location where the PN code repeats is referred to as the PN Epoch.

Spreading the modulated carrier signal with the PN code can be accomplished in a variety of ways. For example, spreading can be accomplished using a PSK modulation technique. Rather than modulating the data signal onto the carrier, as above, a PN code signal is modulated onto the modulated carrier signal. The data rate of the PN code signal, commonly referred to as the chip rate, is typically larger than the symbol rate of the modulated carrier signal. For example, the data (chip) rate of the PN code signal can be 1.2 to 5 (or more) times greater than the symbol rate. Thus, a plurality of PN chips can be modulated onto each symbol in the modulated carrier signal. It is also possible to reverse the steps above, wherein the signal is first spread by modulating it with a PN code and then the information is modulated onto the spread signal.

At the receiving end of the data link, the signal must be either demodulated and despread or despread and demodulated in order to recover the information signal. The spread signal can be despread by modulating the spread signal with the same PN code used to spread it. The PN code at the receiving end must be synchronized with the PN code modulated onto the spread signal in order for the signal to be despread.

Figure 1A:
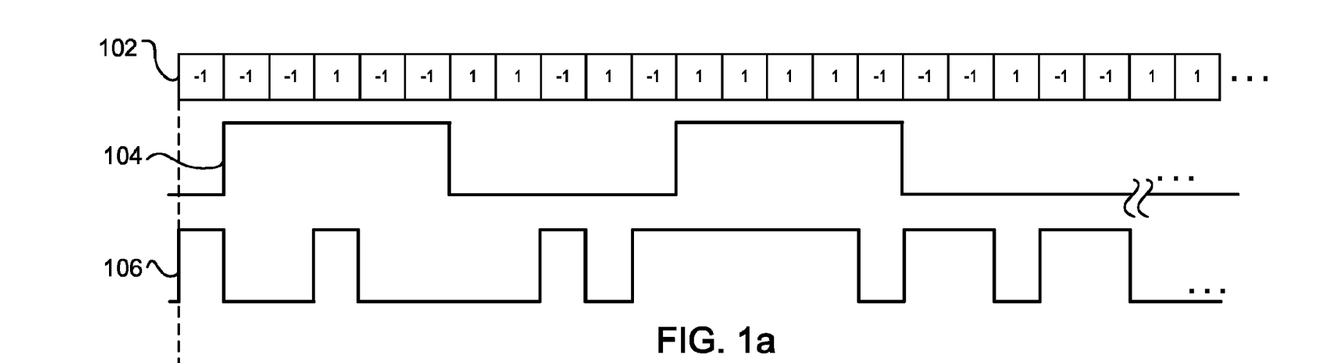
FIGS. 1a-c are diagrams showing an example of a PN code modulated on a carrier signal.
Figure 1B:
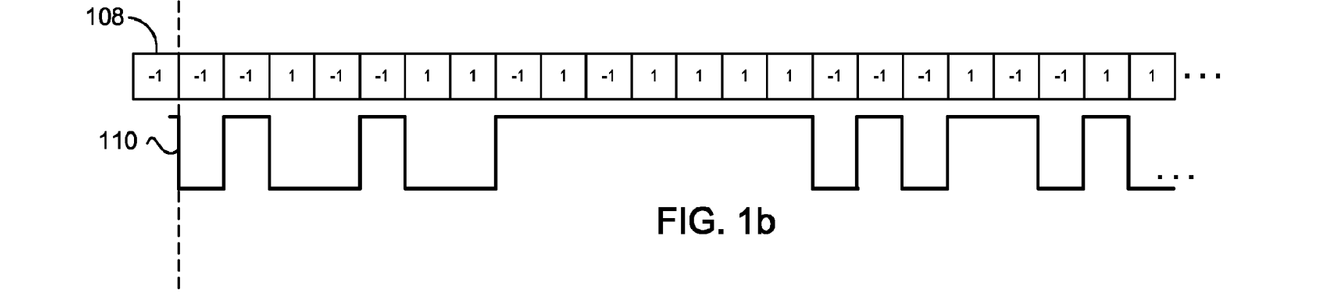
Figure 1C:
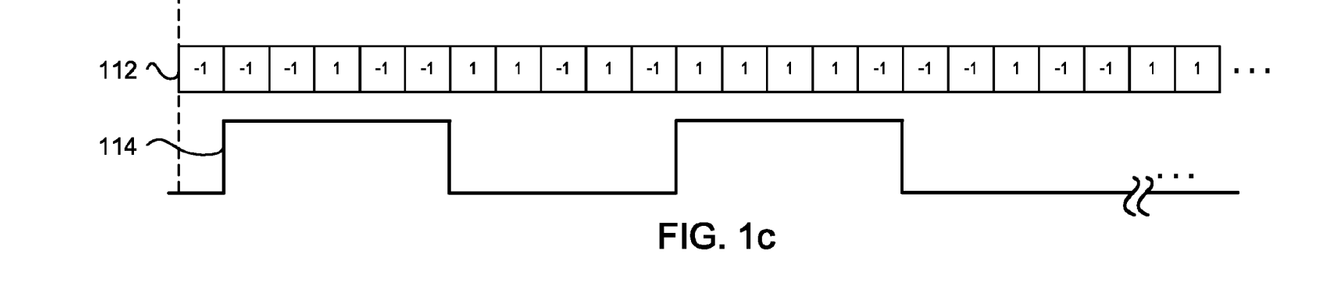

A simple example of spreading and despreading a signal is shown in FIGS. 1a-1c. As shown in FIG. 1a, the modulated carrier signal 104 can be spread before being transmitted by modulating the carrier signal with a PN code 102 resulting in a spread spectrum signal 106. In this example the chip rate, the clock rate of the PN code, is five times faster than the clock rate of the modulated carrier signal. The actual speed of the chip rate of the PN code relative to the clock rate of the carrier signal is determined by the amount of spreading desired. The chip rate is typically an integer multiple times faster than the clock rate of the carrier signal.

The PN code at the receiver must be synchronized, or aligned, with the PN code 102 that was modulated onto the carrier signal when it was transmitted. If the PN code at the receiver is unaligned 108 from the PN code modulated onto the spread spectrum signal by just a single chip, as shown in FIG. 1b, then the PN modulation will result in a scrambled signal 110 having many of the characteristics of random noise. Once the PN code at the receiver is substantially aligned 112 with the PN code 102 (FIG. 1a) modulated onto the carrier signal, re-modulating the spread spectrum signal with the substantially aligned PN code will result in obtaining the original modulated carrier signal 114 that has been despread, as shown in FIG. 1c.

As computing power and data storage have exponentially increased over the last several decades, the corresponding amount of stored data has also exponentially increased. Computers which were once the domain of text files and a few low resolution pictures are now often used to store thousands of high resolution pictures and hours of video. Television sets are being upgraded to show high definition video. New generations of optical discs have been developed to hold the high definition video. The discs can hold as much as 50 gigabytes of data on each side, enough to store several hours of video in a high definition format. Ever larger storage formats are being developed to store the increasing amounts of information.

Another recent trend has been a move toward an increasingly wireless infrastructure. Each year, more electronic devices are available that can communicate wirelessly. Electronics including computers, telephones, computer mouse, telephone headsets, gaming controllers, and many other types of devices have been designed to operate without the need for physical communication paths. Many computers now receive broadband internet which is broadcast throughout the home. Cell phones are able to receive and transmit pictures using complex third generation cellular phone infrastructures. Televisions, many of which had been receiving television signals through a cable, are now receiving high definition signals from satellites and local digital transmitters.

In order to transmit the vast quantities of data stored in computers and broadcast to televisions and other electronics, a large amount of bandwidth is necessary. Bandwidth is proportional to the amount of data which is transmitted over a period of time, usually measured in seconds. For example, to transmit a 15 gigabyte high definition movie stored on a DVD to a wireless home entertainment system, it requires 100 megabits transmitted per second for twenty minutes.

One simple way to provide a level of security to all of the data being wirelessly transmitted and to reduce interference with other wireless transmitters and receivers is to spread the data carrier signal using a PN code. Assuming (as shown in FIGS. 1a-1c) that the data carrier signal is spread at a chip rate five times faster than the data rate, the transmission of a signal transmitting 100 megabits per second of data requires a PN code chip rate of 500 megachips per second. At 500 megachips per second, the amount of time between each chip is less than 2 nanoseconds. Producing a pseudo-random sequence of bits at that rate can be extremely difficult, if not impossible, with current technology.

As previously discussed, one method which can be used to produce the PN code at the increased rate is to use a plurality of PN generators and multiplex their outputs together, as discussed in related U.S. patent application Ser. No. 11/336,493 (now U.S. Pat. No. 7,613,757), which is herein incorporated by reference. Using a plurality of PN generators in parallel to generate a PN code at an increased rate can be computationally intensive. Additionally, such a system does not provide information about the PN code's zero phase, which can be useful in recovering from PN code phase errors.

In communications systems where computational processing availability is limited, it may be difficult to generate the PN code using a plurality of PN generators in parallel. In accordance with one embodiment of the invention, it has been recognized that a system and method is needed to generate a PN code at an increased rate that is less computationally intensive.

A system and method have been developed to generate a PN code at an increased rate using a memory-based parallel PN sequence generator. The memory-based parallel PN generator can be used to generate a PN code at a high rate, while limiting the amount of computational processing required to produce the high rate PN code. Further, a memory-based parallel PN generator can provide information about the PN code's zero phase to enable the system to recover from PN code phase errors.

Figure 2:
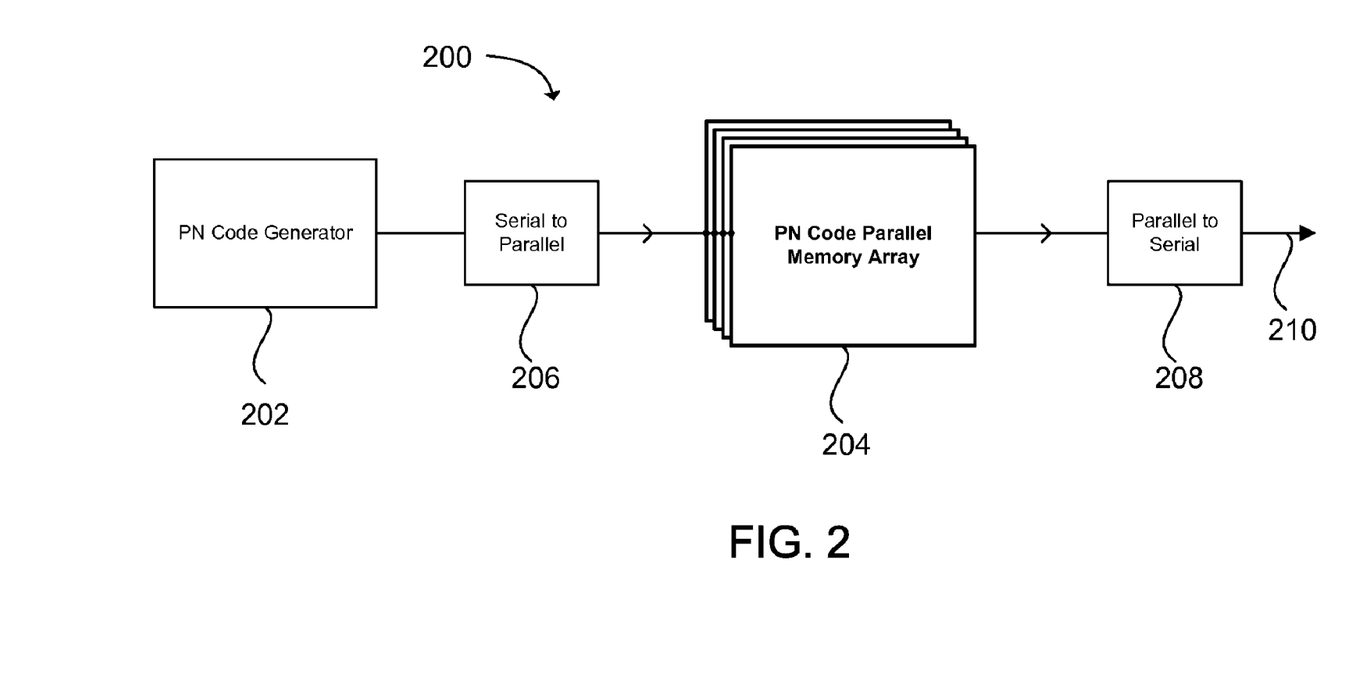
FIG. 2 is an illustration of a system for a memory-based parallel Pseudo-random Noise (PN) code generator in accordance with an embodiment of the present invention.

One embodiment of the invention is illustrated in FIG. 2. A system 200 for parallel (PN) code generation is shown. The system can include a PN code generator 202. The PN code generator can be used to supply a desired PN code. For example, the PN code generator may be a memory such as a random access memory or a read only memory capable of storing the desired PN code. Alternatively, it may be a processor configured for generating the code. In another embodiment, a Linear Feedback Shift Register (LFSR) may be used to generate the desired PN code. The PN code generator can generate the PN code in non-real time, prior to the PN code's use.

The output of the PN code generator can then be stored in a parallel memory array 204. The parallel memory array comprises a plurality of digital memories. In one embodiment, each memory in the array can be independently addressable. The digital memory may be random access or read only memory. Random access type memory can enable PN codes to be updated or replaced with different PN codes. Any type of digital device capable of storing the PN code supplied by the PN generator and outputting the code at a desired rate can be used. For example, solid state memory devices such as Static RAM (SRAM), Dynamic RAM (DRAM), Magnetic RAM (MRAM), Phase-change RAM (PRAM), and the like can be used. Solid state memory may be preferable due to issues such as power requirements, robustness, and speed. Other types of rewritable digital memory may also be used, such as a magnetic hard drive, an optical disc, holographic memory devices, and so forth. The digital memories in the memory array can be located in one or more field programmable gate arrays (FPGA), such as a Xilinx®.

The PN code generator 202 can output a PN code having a desired length. For example, the PN code may have an odd length $2^N-1$, where N is the number of bits in the LFSR. An even code having a length of $2^N$ may also be generated, as can be appreciated. The PN code can be output from the PN code generator and sent through a serial to parallel conversion device 206. The device can enable every Lth chip to be stored in a memory array comprising L digital memories 204, respectively. Each of the L memories can be configured to operate at a substantially similar rate. The memory array can then output the PN code at a selected rate. Each of the L memories can output a chip in parallel. The L chips can be sent through a parallel to serial conversion device 208 and output at a rate that is L times the selected rate. For example, if L equals 4 and each memory is configured to output a chip in the PN code at a rate of 125 MHz, a PN Code output 210 from the parallel to serial device can have a chip rate of approximately 500 MHz.

A PN code is typically output in a continuous loop. As previously mentioned, the location where the PN code repeats is referred to as the PN epoch. A PN code with an even length can enable a chip to be output from each of the L digital memories each clock cycle. When the end of the code is reached, the code can be repeated starting with the first chip of the PN code at the next clock cycle. However, when a PN code with an odd length of $2^N-1$ chips is used, it results in an empty bit in one of the L digital memories at the PN epoch location. Including the empty bit in the PN code sequence output from the L memories can result in an unrecoverable error since inclusion of even a single error in the PN code can disrupt the spreading and despreading operation, as previously described with regard to FIGS. 1a-1c. A method is needed for continuous parallel Pseudo-random Noise (PN) code generation of a PN code having an odd length.

Figure 3A:
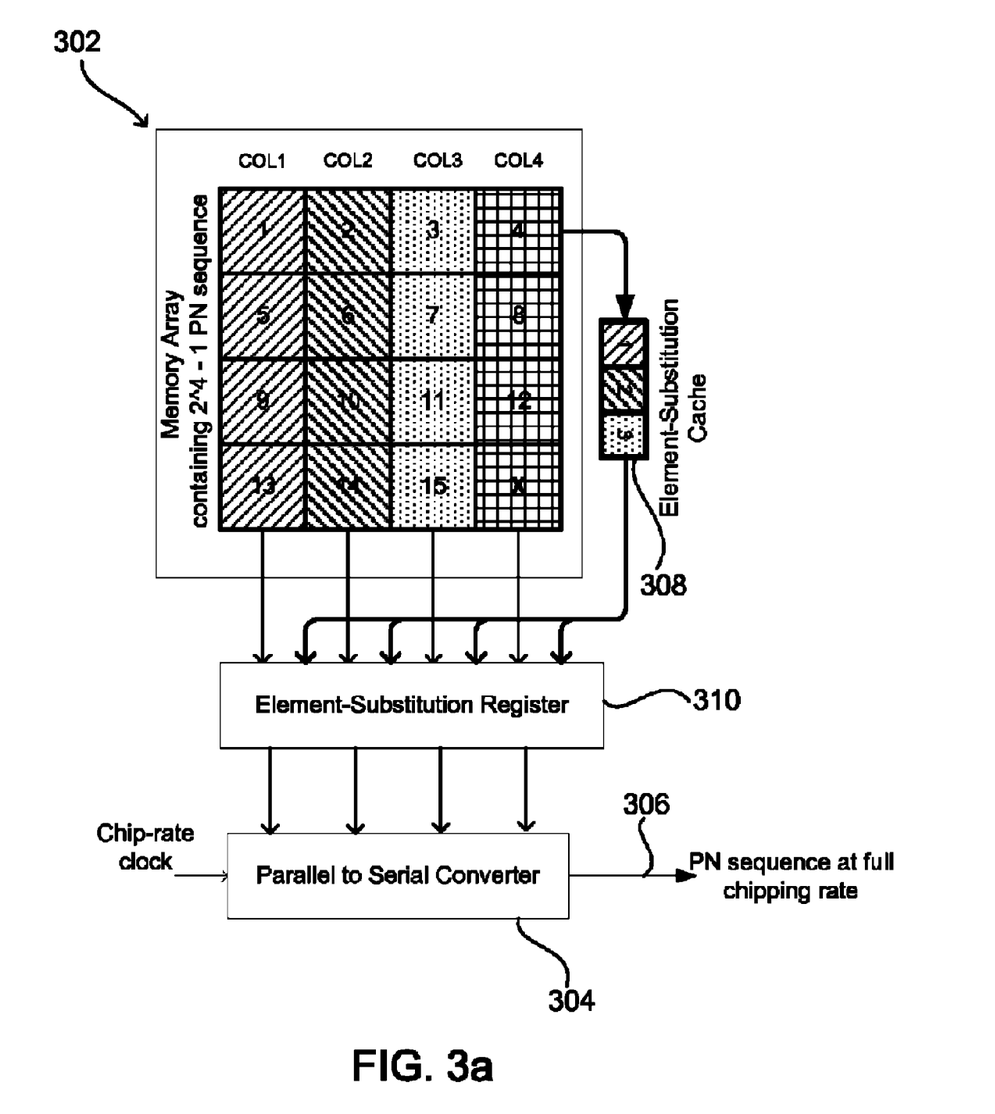
FIG. 3a is an illustration of a memory array for parallel Pseudo-random Noise (PN) code generation in accordance with an embodiment of the present invention.

In one embodiment, an element substitution cache can be used to store one or more elements of the PN code. The memory cache can be separate from the L digital memories and can be used to compensate for the empty bit in at least one of the L digital memories. For example, FIG. 3a shows a memory array 302 containing a PN sequence having a length of $2^4-1$ chips. In this example, the memory array comprises 4 different memories, shown as columns 1-4. Each memory includes 4 bits to store 4 chip values. The 15$^{th}$ chip value is stored in Row 4 of the third memory illustrated as Col. 3 in FIG. 3a. With an odd number of chips in the PN sequence, the sequence leaves an empty bit in the last memory. The Row 4 bit in the fourth memory, represented as Col. 4, can be left blank. Each of the memories can output a chip in parallel. The chips can be communicated to the parallel to serial converter 304. The converter can be clocked with a chip-rate clock that is four times as fast as each individual memory. This can provide a PN sequence output 306 at a full chipping rate, a rate that is L (four) times the digital memory output rate.

The fourth set of four chips output from the memories in the example memory array 302 comprises elements 13, 14, 15, and the empty bit. An element-substitution cache 308 can be used to supply a portion of the PN code to the parallel to serial converter 304. The element-substitution cache can be integrated with an output of the memory array using an element-substitution register 310. The element-substitution register can incorporate the portion of the PN code from the cache memory to fill the empty bit in the Col. 4 memory. In one embodiment, the element-substitution cache can include the first L−1 bits of the PN code, as will be further described below. Using the element-substitution memory cache and the element-substitution register can allow a PN sequence having an odd length to be output continuously without including the empty bit in the sequence output from the memory array.

Figure 3B:
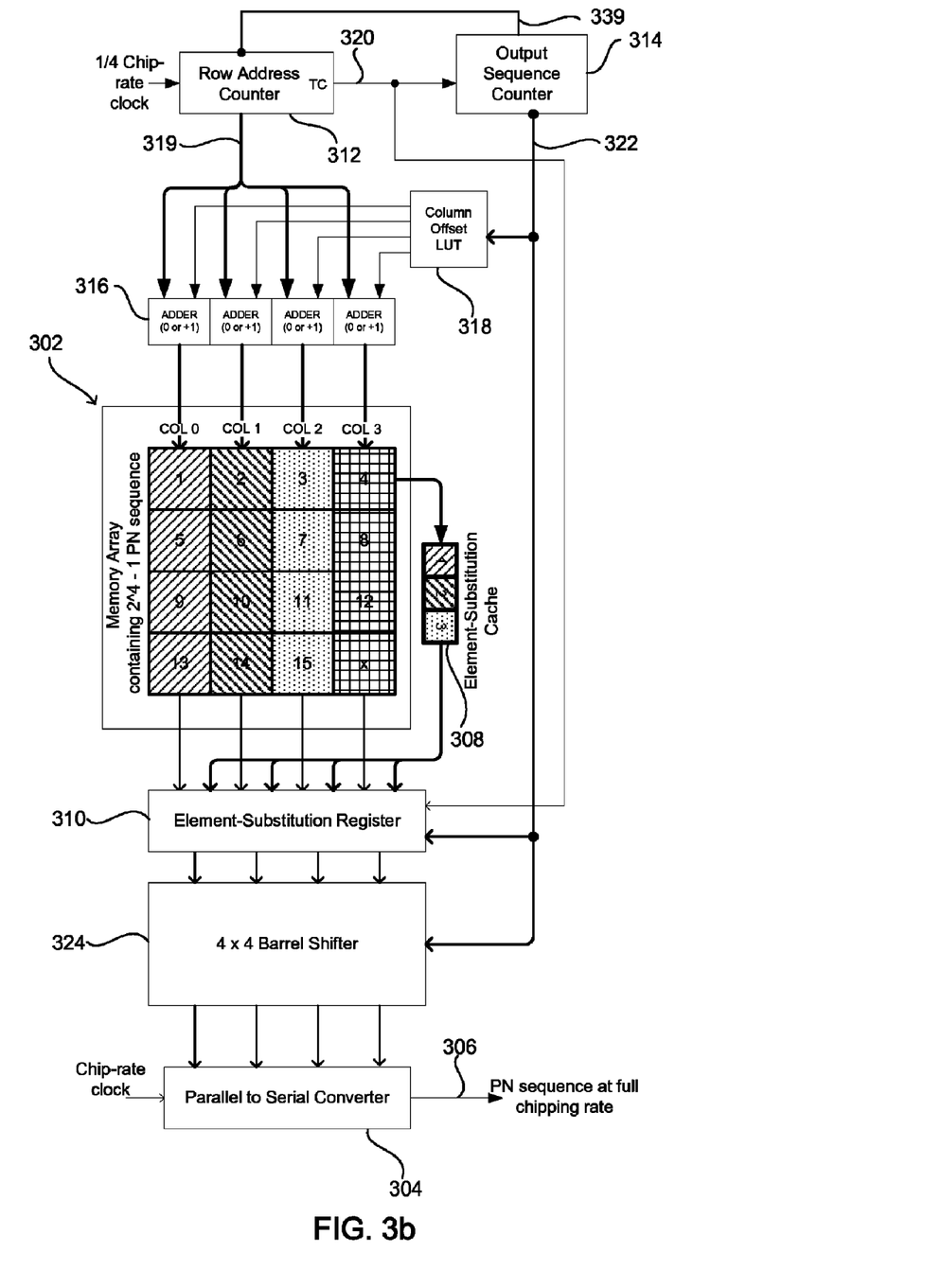
FIG. 3b is an illustration of a memory array for parallel Pseudo-random Noise (PN) code generation using an element-substitution cache in accordance with an embodiment of the present invention.

For example, FIG. 3b illustrates one example embodiment for generating a PN sequence having an odd length using a memory array 302 and an element-substitution cache 308. In this example, a row address counter 312 can be clocked at 1/L times the chip rate clock, where L is the number of parallel memories used in the memory array and the chip rate is the rate at which the full PN sequence is generated at the PN sequence output 306. In the example shown in FIG. 3b, L is equal to four. The row address counter can operate at substantially the same rate as each of the L memory devices. An output of the row address counter can be sent to an output sequence counter 314 and L adders 316. The output 322 of the output sequence counter 314 can be sent to a column offset lookup table (LUT) 318. The adders are configured to add a 0 or a +1 to the row address counter, depending on an output of the column offset LUT.

In the illustration of FIG. 3b, a maximal length PN sequence comprising $2^4-1$ chips is initially stored in the memory array 302. The memory array is configured as four memories represented by four columns (Col. 0-Col. 3), each having 4 rows (0-3) comprising storage locations for bits 1 to 16. The 16$^{th}$ bit location is not written since the PN sequence is 15 chips long. Each column represents an independently addressable digital memory in the memory array. The memory array can be a random access memory (RAM), or, if the PN sequence never changes, the sequence could be initialized into a read only memory (ROM).

During readout of the PN sequence from the memory array 302, the row address counter 312 is configured to increment every L clock cycles, counting up to a terminal count 320 of the PN sequence code length divided by the number of memory devices, or $(2^N)/L$, where N is a positive integer. In this example, N=4 and L=4 for a terminal count of 4. In a digital system the terminal count, $T_c$ may be represented as 0 to $(2^N/L)-1$. The terminal count can increase to $(2^N/L)-1$ and then wrap to zero. Upon reaching the terminal count, an output sequence counter 314 can increment by one. This cycle can continue for the output sequence counter until it counts through a value of L. In this case the output sequence counter can increase from zero to three and then wrap back to zero. The address for each memory device in the memory array, c0 to c3, is derived by adding either zero or one to the row address count 319 using the adders 316. The offset added to each column address c0 to c3 for each output sequence count can be as follows:

|  | $c_0$, | $c_1$, | $c_2$, | $c_3$ |
|---|---|---|---|---|
| Count0 = | 0, | 0, | 0, | 0 |
| Count1 = | 1, | 0, | 0, | 0 |
| Count2 = | 1, | 1, | 0, | 0 |
| Count3 = | 1, | 1, | 1, | 0. |

The offset values for each count can be stored in the column offset LUT. The first L−1 elements of the PN sequence can initially be saved in the element-substitution cache 308. The element-substitution cache can be a 1×L−1 register for retrieval at each row address terminal count 320. Depending on the output sequence count 322, the elements saved in the element-substitution cache 308 can be used in lieu of the actual first L−1 elements, which may be unavailable at the outputs of the memory devices in the memory array 302 at the terminal count 320. The elements can be substituted for the elements stored in the L memories using the element-substitution register 310.

Figure 3C:
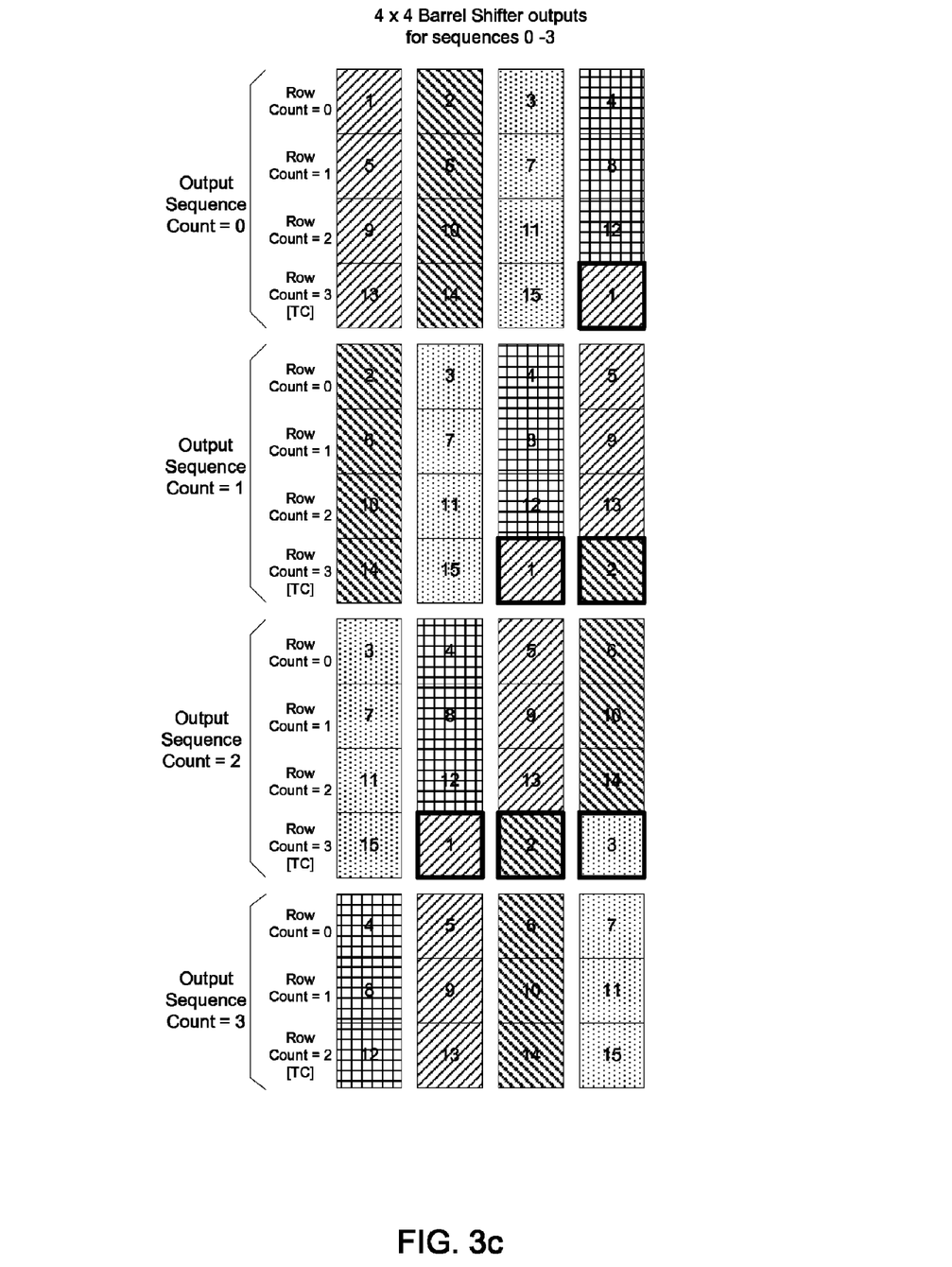
FIG. 3c is an illustration of an output of the memory array of FIG. 3b in accordance with an embodiment of the present invention.

The parallel outputs of memory devices c0 to c3 in the memory array 302 can be directed to a device configured to rotate the columnar output. For example, a 4×4 barrel shifter 324 is used in this example to rotate through the final 4-bit parallel output bits for each output sequence count 322 as follows:
 Count0=c0, c1, c2, c3
 Count1=c1, c2, c3, c0
 Count2=c2, c3, c0, c1
 Count3=c3, c0, c1, c2.
The outputs of the 4×4 barrel shifter 324 for output sequence counts zero to three are shown in FIG. 3c. It should be noted that for the last count (Count3 in this example) of the output sequence counter, the read memory depth is one row shorter. Thus, a terminal count (TC) occurs at a row count of two. Decreasing the terminal count for the last count of the output sequence counter can be accomplished, in one example, with a feedback 339 from the output sequence counter 314 to the row address counter 312. This completes the cycle of outputting the $2^N-1$ chips from the parallel memories in the memory array. The output sequence count can then wrap to zero and begin reading out the PN sequence again, enabling a continuous output of the $2^N-1$ chips in the PN sequence at a rate that is L times the output rate of the digital memories in the memory array 302.

Figure 4A:
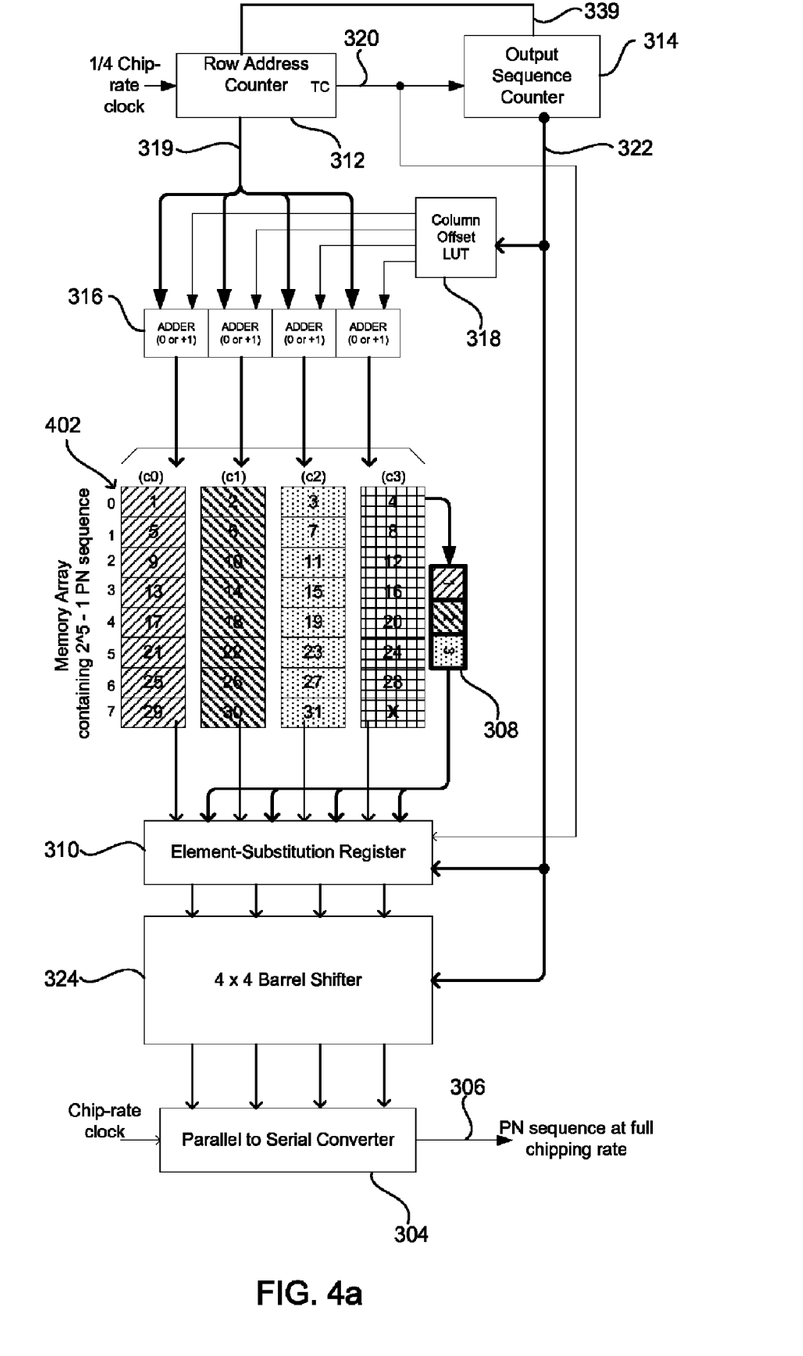
FIG. 4a is an additional illustration of a memory array for parallel Pseudo-random Noise (PN) code generation using an element-substitution cache in accordance with an embodiment of the present invention.
Figure 4B:
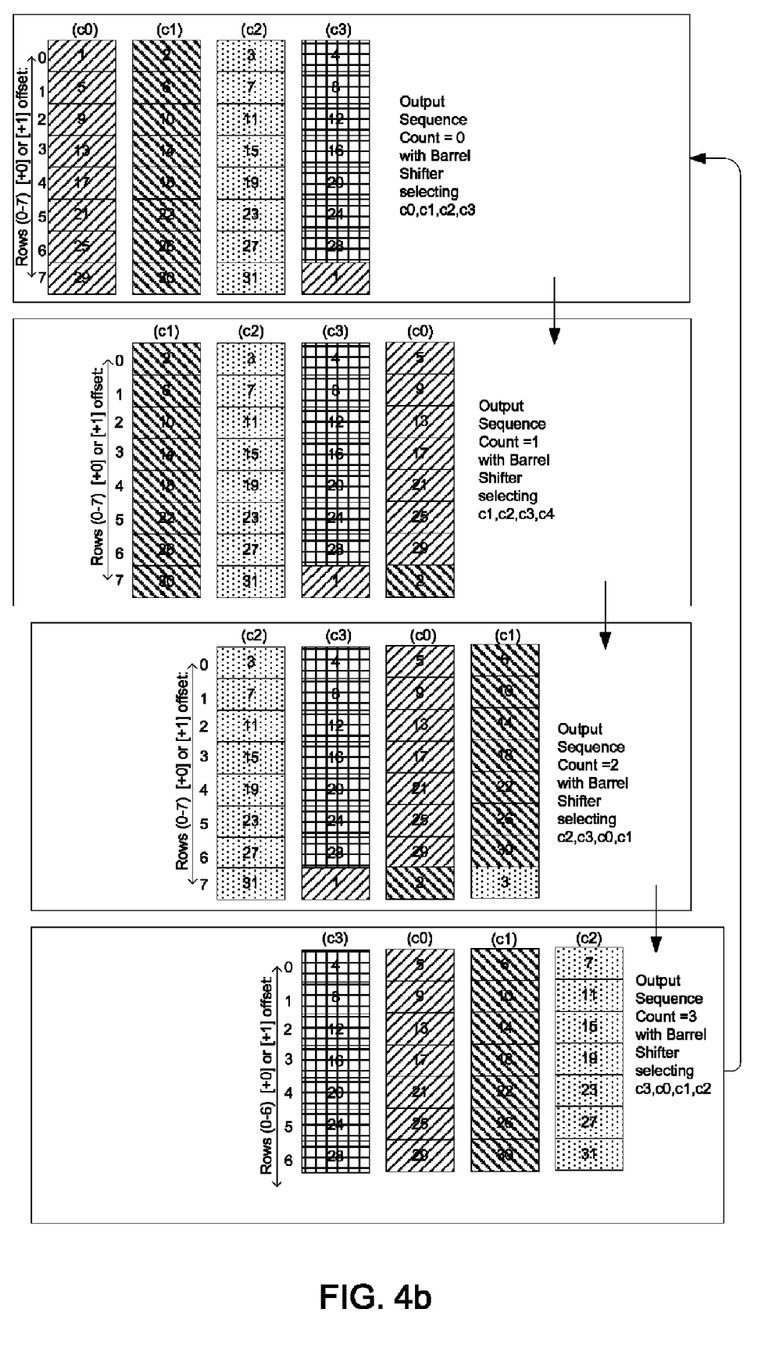
FIG. 4b is an illustration of an output of the memory array of FIG. 4a in accordance with an embodiment of the present invention.

Another example embodiment is shown in FIGS. 4a and 4b for a maximal length PN sequence for N=5. In this example, a maximal length 31-chip length PN sequence ($2^5-1$) is stored sequentially into a memory array 402 comprising L digital memories, with L=4. Each digital memory can store $2^N/L$ bits, or 8 chips in this example. Since the PN sequence is a maximal length sequence with an odd number of chips ($2^N-1$), the bit at column three, row seven is not written to.

During readout, a row address counter 312 increments every L chips, counting up to a terminal count of $(2^N/L)-1$ and wrapping to zero. Upon reaching the terminal count, an output sequence counter 314 can increment by one for a total of L terminal outputs from the counter. In this example, the counter outputs are from zero to three.

The address for each digital memory in the memory array 402, c0-c3, is derived by adding either 0 or 1 to the row address counter output 319. This can be accomplished using an array of adders 316. The offset added to each column address c0 to c3 for each output sequence count 322 is as follows:

|  | $c_0$, | $c_1$, | $c_2$, | $c_3$ |
|---|---|---|---|---|
| Count0 = | 0, | 0, | 0, | 0 |
| Count1 = | 1, | 0, | 0, | 0 |
| Count2 = | 1, | 1, | 0, | 0 |
| Count3 = | 1, | 1, | 1, | 0 |

These offset values can be stored in the column offset LUT 318. The first L−1 elements of the PN sequence, shown in R0, c0 to c2 in this example, are initially saved in a 1×L−1 element-substitution cache 308. The elements can be retrieved at each row address terminal count 320. Depending on the output sequence count, the elements stored in the cache are used in lieu of the actual first L−1 elements which may be unavailable at the outputs of the memory devices at the terminal count.

The parallel outputs of the digital memory devices c0 to c3 are fed to an L×L barrel shifter 324 which can rotate through the final 4-bit parallel output bits for each output sequence count 322 as follows:
 Count0=c0, c1, c2, c3
 Count1=c1, c2, c3, c0
 Count2=c2, c3, c0, c1
 Count3=c3, c0, c1, c2.
The 4×4 barrel shifter 324 outputs for output sequence counts zero to three are shown in FIG. 4b. As in FIG. 3c, at the Lth count (Count3 in this example) of the output sequence counter, the read memory depth is one row shorter. Thus, a terminal count occurs at a row count of $(2^N/L)-1$, or at row 6 in this case. The feedback loop 339 can be used to enable the read memory depth to be shortened, as previously discussed. This assumes that the row count numbering begins at zero. The output sequence counter can then wrap to zero and the PN sequence comprising the 31 chips can be continuously generated from the L parallel digital memories in the memory array 402 at a chip rate that is L times the output rate of each of the L digital memories in the array.

Figure 5:
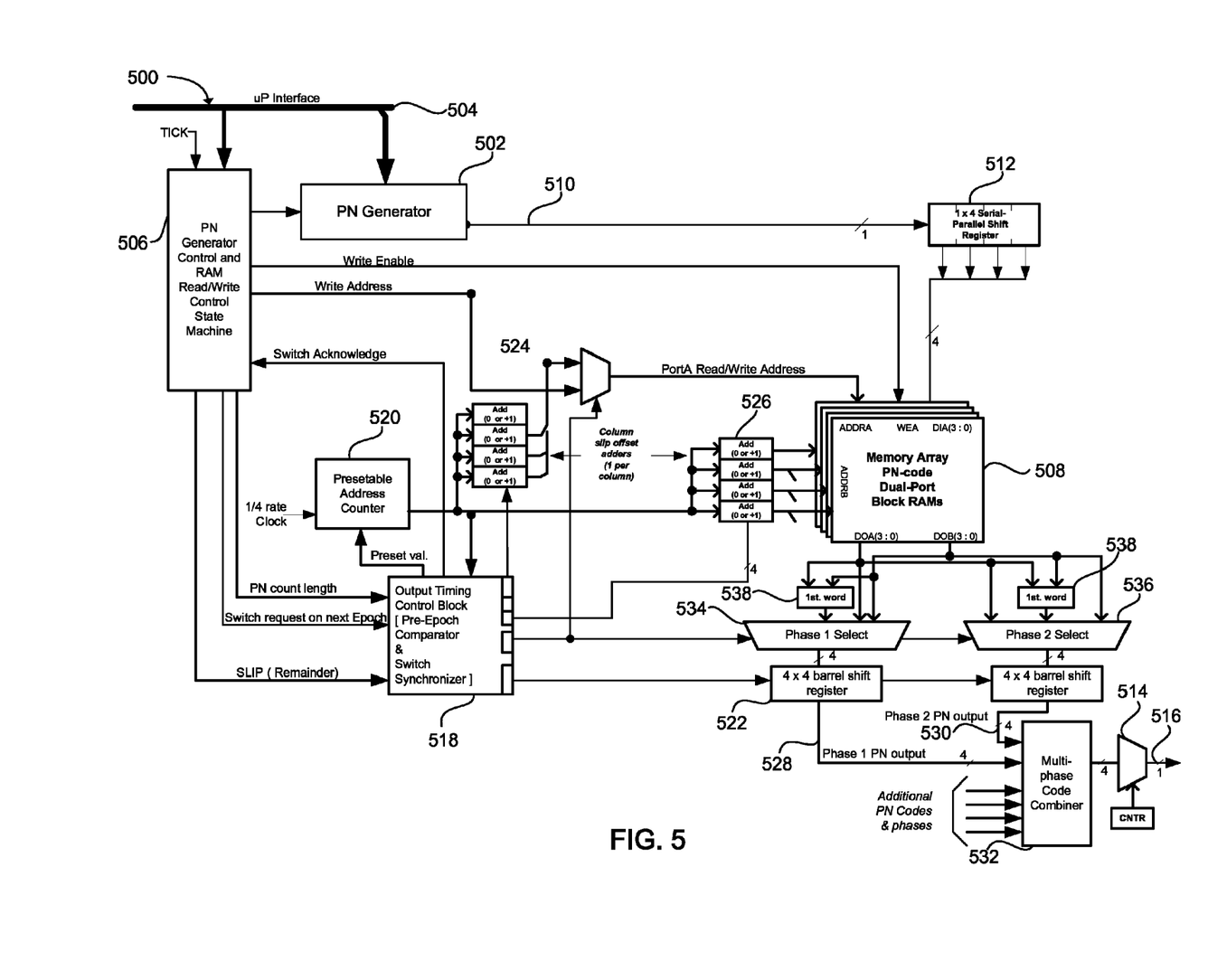
FIG. 5 is a schematic of a system for a memory-based parallel Pseudo-random Noise (PN) code generator in accordance with an embodiment of the present invention.

FIG. 5 illustrates a schematic of an example embodiment of a memory-based parallel PN code generator system 500. The parallel generator system includes a PN generator 502. The PN generator can be memory based, processor based, or LFSR based, as previously discussed. The PN generator can be interfaced 504 with a microprocessor used to control the system. A state machine 506 can also be in communication with the PN generator and the microprocessor. The state machine can be used to control the PN generator. The state machine can also be used to control a memory array 508 configured to receive a PN code output from the PN code generator.

In one embodiment, the microprocessor interface 504 can be used to instruct the PN generator 502 to output 510 a desired PN code with a predetermined length. The code can be sent through a serial to parallel device, such as the 1×4 serial parallel shift register 512. The shift register can communicate the PN code to be stored in L digital memories in the memory array 508. In the example shown in FIG. 5, there are four separate digital memories shown in the array. However, the system can be expanded to include 8, 16, 32, or more memories. Each of the memories in the array can be independently addressable to enable the memories to each output a chip in the PN code simultaneously. The PN code stored in the memory array can be read, as previously described, to allow both even length codes and odd length codes to be output continuously. The output of the memory array can be sent through a register, such as the 4×4 barrel shift register 522, to arrange the output in the same order as the PN generator output 510. A serializer 514 operating at L times the rate of the digital memories in the memory array can be used to convert the parallel output of the memory array to a serial PN sequence output 516 at a chip rate that is L times the rate of the output rate of the digital memories in the memory array.

An output timing control block 518 can be used to control the output of the memory array 508. For example, the timing control block can be used to slip the PN code output forward or backward to adjust the output to a desired area within the PN code sequence. This can be useful in synchronizing the PN code generated using the memory-based parallel PN code generator system 500 with a PN code on a received signal.

With traditional LFSR-based PN sequencers, PN code phase manipulations (phase slipping and advancing) are typically accomplished by swallowing (withholding) a desired number of clock cycles from individual component PN code generators. With a memory-based PN generator, as shown in FIG. 5, slipping can be performed simply by modifying a memory address, effecting the phase slip substantially instantaneously. The output timing control block 518 can control a presetable address counter 520 to output a desired section of code within the PN code sequence stored in the memory array 508.

The memory-based parallel PN code generator system 500 can also be useful in generating a plurality of different phases of a PN code. For example, a first adder array 524 and a second adder array 526 can be used to read the PN sequence stored in the memory array 508 at two different addresses simultaneously. Each of the L digital memories in the memory array can be dual port memories, allowing the memories to each simultaneously output two bits stored in two different locations within the memory. This allows the memory array to simultaneously output the PN sequence in two different phases, a phase 1 PN output 528 and a phase 2 PN output 530. The phase 1 and/or phase 2 PN outputs can be selected using the phase select 534, 536 and element substitution cache 538. The PN sequences with the different phases can then be combined in a multi-phase code combiner 532, if desired.

Different phases of the same PN code sequence can be used for Code Division Multiple Access (CDMA) applications. Each one chip delay of a component code's least significant bit output has a deterministic composite code phase shift relative to the phase of the composite PN code produced by component code least significant bit outputs. In the memory-based parallel PN code generator system 500, CDMA selection is not limited to a few one-chip component code delays. Any chip delay relative to the effectual least significant bit output can be programmed. The multi-phase code combiner 532 can also be used to generate I and Q PN code sequences used in quadrature modulation schemes.

Figure 6:
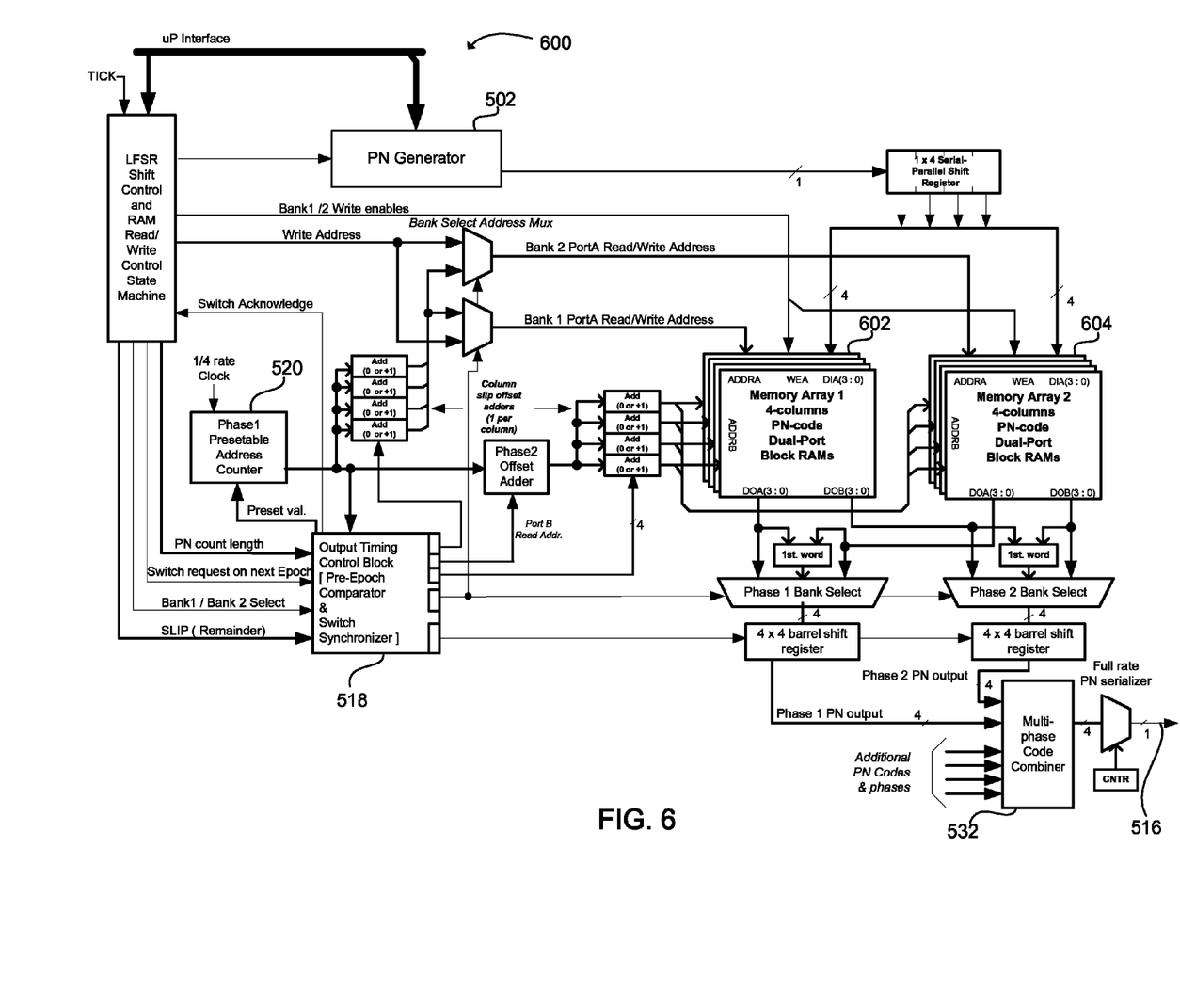
FIG. 6 is a schematic of a system for a memory-based parallel PN code generator having a plurality of memory arrays in accordance with an embodiment of the present invention.

In another embodiment, a memory-based parallel PN code generator system 600 can include a plurality of memory arrays, as shown in FIG. 6. For example, the system can include a first memory array 602 and a second memory array 604. The use of more than one memory array, as shown in FIG. 6, can enable a continuously generated PN sequence to comprise multiple different PN codes. For instance, a first PN sequence can be continuously output from the first memory array. A second PN sequence can be generated by the PN generator 502 and stored in the second memory array. The output timing control block 518 can be used to switch from the first memory array to the second memory array while continuously generating a PN sequence at the output 516.

Switching to a new PN sequence typically occurs at an epoch location after the previous PN sequence has completed. The use of multiple PN codes can increase the security of the information being transmitted. Multiple PN codes can also increase the number of PN sequences that can be output 516 from the multi-phase code combiner 532.

While simple examples have been used to illustrate the process by which a PN sequence can be generated using a parallel output from a plurality of memory devices, longer and more complex sequences can be generated. For example, a PN code may be generated using a 1 bit×17 LFSR to form a PN code having a length of $2^{17}-1$ chips. The PN code, comprising 131,071 chips, can then be stored in a memory array having L independently addressable digital memories. When L is equal to four, the first three memories can include $2^N/4$ (32,768) chips and the fourth memory can include 32,767 chips. The 32,768$^{th}$ bit in the fourth memory can remain unwritten, as previously discussed. The L memories must each be capable of storing at least $2^N/L$ bits. However, it should be noted that the memories can be of any size greater than $2^N/4$ bits. Each memory may output the PN sequence in parallel at a predetermined speed. For example, each memory may output at 125 MHz to generate a PN sequence at 500 MHz.

When L is equal to eight, the first seven memories can include 16,384 chips and the eighth memory can include 16,383 chips. Each memory can output a chip in parallel, resulting in a 1 GHz output of the PN code if each memory outputs the sequence in parallel at 125 MHz.

Producing the PN sequence using the parallel memory arrays can also provide additional benefits. One benefit is the ability to recover from a PN code phase error. Using a component code and a counter 520 configured to count the composite PN code phase, the memory-based parallel PN code generator system can accurately determine component code generator phase. The phase of an individual component PN code generator is the counter value modulo a length of the component code.

In a system with intentional PN slips and advances (phase movement within the composite PN code), the sum of intentional slips and advances can be kept in a register. The phase of an individual component PN code generator is the counter value plus the register content modulo the length of the component code.

In a conventional sequential PN code generator, recovery from a PN code phase error is not necessarily possible. For example, a network may comprise 50 platforms or a combination of 50 platforms and ground stations. Each platform and/or ground station typically has its own PN code generator. In order to communicate, the PN generators within the network are typically synchronized with a counter located at a hub. A PN code error may be detected at the hub. The PN code phase identified by the epoch events, the real, generated PN code phase, may disagree with the counted number of clock cycles withheld at each component code generator. Tracking the number of clock cycles withheld at each component generator is referred to as bookkeeping. Composite PN code phase can typically be determined from component code phase bookkeeping. However, an ambiguity may exist: the PN code phase (determined by its epoch occurrences) may not be where the bookkeeping component code phases say it should be. The phase of a component code generator, determined by the number of clock cycles withheld from the generator, may not correspond with the true epoch position of the component code. For a conventional LFSR generator, true PN code phase is not known. The only thing that is known is the number of clock cycles withheld. This indicates where the zero phase of the PN code should be.

Errors between the bookkeeping and the actual phase of a component code generator can occur for a variety of reasons. A common failure with PN code generation coordinated with a reference source deals with the startup sequence. The PN reset can occur at a time other than the initialization of the chip counter. The failure can occur because the startup sequence is typically quite complicated. In startup, many remote devices are typically being managed. These devices are often not found on the same processor or printed wiring board. Buses and embedded microprocessors may also be involved. Opportunities abound for a mistake to occur or for the sequence to be derailed by one processor or another. Either the counter or the PN generator can get an unintended head start. This can result in a counter that does not reflect the PN code phase of the generator. The only recovery from an unknown phase error, when an LFSR is involved, is to perform a PN reset that involves truly coordinated start times of the counter and PN generator.

When a hub is forced to perform a PN reset, the whole network 50 or more platforms is interrupted. Recovery with a memory-based PN code sequence can consist of a modulo verification of component code phase with the clock counter and subsequent corrective phase placement. Phase manipulations with chip precision are possible using the memory-based parallel PN code generator system. The ability to recover from a PN code phase error provides a distinct advantage to memory-based PN systems. Costly network resets can be avoided which can substantially increase the reliability of the networked communication system. The increase in reliability can enable communication in the field to occur with a decrease in disruptions, providing a significant advantage in battlefield communications and other critical command and control infrastructure.

Figure 7:
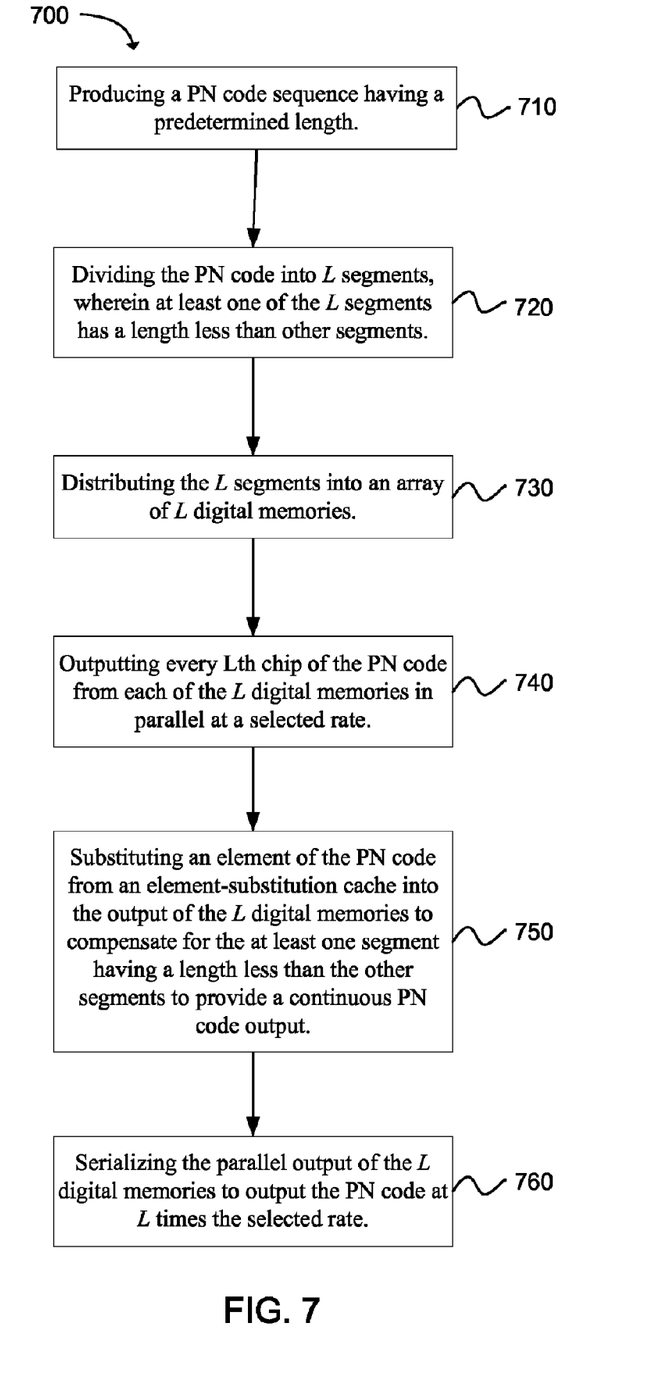
FIG. 7 is a flow chart depicting a method for parallel Pseudo-random Noise (PN) code generation.

Another embodiment of the present invention provides a method 700 for parallel PN code generation, as illustrated in FIG. 7. The method includes the operation of producing 710 a PN code sequence having a predetermined length. The method further comprises dividing 720 the PN code into L segments, wherein at least one of the L segments has a length less than other segments. The shorter segment can be caused by a PN code sequence having an odd length. Another operation involves distributing 730 the L segments into an array of L digital memories. Every Lth chip can be stored in each of the digital memories. An additional operation includes outputting 740 every Lth chip of the PN code from each of the L digital memories in parallel at a selected rate. The method also includes the operation of substituting 750 an element of the PN code from an element-substitution cache into the output of the L digital memories to compensate for the at least one segment having a length less than the other segments to provide a continuous PN code output. An additional operation involves serializing 760 the parallel output of the L digital memories to output the PN code at L times the selected rate.

Another embodiment of the present invention provides a computer readable medium having computer readable program code means embodied therein for causing a memory-based parallel Pseudo-random Number (PN) generator to generate a PN code sequence. The computer readable medium can include random access memory, read only memory, dynamic random access memory, static random access memory, phase change memory, magnetic memory, a magnetic recording medium, an optical recording medium, a holographic recording medium, and other types of computer readable mediums capable of storing the computer readable code means, as can be appreciated.

While the forgoing examples are illustrative of the principles of the present invention in one or more particular applications, it will be apparent to those of ordinary skill in the art that numerous modifications in form, usage, and details of implementation can be made without the exercise of inventive faculty, and without departing from the principles and concepts of the invention. Accordingly, it is not intended that the invention be limited, except as by the claims set forth below.

The invention claimed is:

1. A method for memory-based parallel Pseudo-random Noise (PN) code generation, comprising:
producing a PN code sequence having a predetermined length;
dividing the PN code into L segments, wherein one of the L segments has a length less than other segments;
distributing the L segments into a memory array having L digital memories so that each segment is placed into a row across the memory array and one row is less than L in width corresponding to the one of the L segments that has a length less than other segments;
outputting data from the L digital memories in parallel at a selected rate to form a parallel output;
substituting at least one element of the PN code from an element-substitution cache in place of the output of the L digital memories to compensate for the row that is less than L in width to provide a continuous PN code output; and
serializing the parallel output of the L digital memories to output the PN code at L times the selected rate.

2. A method as in claim 1, further comprising adjusting a phase of the PN code to synchronize with a received signal by selecting a desired address location within the memory array to output the PN code at a selected point within the PN code sequence.

3. A method as in claim 1, further comprising generating at least two PN code sequence outputs from the memory array, wherein the at least two PN code sequence outputs have a different phase.

4. A method as in claim 3, further comprising combining the at least two PN code sequence outputs having the different phase to form a multiphase PN code.

5. A method as in claim 1, further comprising recovering from a PN code phase error by calculating a modulo verification of a component code phase with a clock counter to determine a corrected phase at which to output the PN code from the memory array.

6. A system for memory-based parallel Pseudo-random Noise (PN) code generation, comprising:
a PN generator configured to produce a PN code having a predetermined length;
a serial to parallel converter configured to divide the PN code into L segments, where L is a positive integer and wherein at least one of the L segments has a length less than other segments;
a memory array comprising L digital memory devices configured to store the L segments of the PN code, wherein the L digital memory devices are configured to output data in parallel at a selected rate;
an element-substitution cache configured to store a portion of the PN code; and
an element-substitution register configured to insert at least one chip from the element-substitution cache in place of at least one output of the memory array to compensate for the at least one segment having the length less than the other segments to provide a continuous PN code output.

7. A system as in claim 6, further comprising a serializer configured to serialize the continuous PN code to output the PN code at L times the selected rate.

8. A system as in claim 6, wherein the PN generator is configured to produce the PN code at a rate less than the output of the serializer.

9. A system as in claim 8, wherein the element-substitution cache contains the first L−1 chips in the PN code.

10. A system as in claim 6, wherein each of the L digital memory devices is independently addressable.

11. A system as in claim 6, wherein the digital memory devices are selected from the group consisting of random access memory, read only memory, dynamic random access memory, static random access memory, phase change memory, magnetic memory, a magnetic recording medium, an optical recording medium, and a holographic recording medium.

12. A system as in claim 11, wherein the digital memory devices are located in one or more field programmable gate arrays.

13. A system as in claim 6, further comprising a row address counter configured to sequentially count at a memory device output rate from 0 to (2N/L)−1, where 2N−1 is a length of the PN code and N is a positive integer, wherein the row address counter is further configured to output a terminal count signal when reaching a count of (2N/L)−1.

14. A system as in claim 13, further comprising an output sequence counter configured to receive the terminal count signal and output a value from 0 to L−1.

15. A system as in claim 14, further comprising a column offset lookup table configured to output L values to be added to L row values from the row address counter based on an output from the output sequence counter, wherein the added values enable readouts from each of the L digital memory devices to be shifted.

16. A system as in claim 14, further comprising an L×L barrel shifter configured to rotate the parallel output of the L digital memory devices based on an output of the output sequence counter.

17. A system as in claim 6, wherein the PN generator is selected from the group consisting of a linear feedback shift register based PN generator, a memory-based PN generator, and a digital processor based PN generator.

18. A system as in claim 6, further comprising a plurality of memory arrays configured to store a plurality of different PN codes.

19. A system as in claim 18, wherein the plurality of memory arrays includes a first memory array and a second memory array, the first and second memory arrays configured to generate a first and second PN code to enable a continuous output comprising the first PN code directly followed by the second PN code.

20. An article of manufacture comprising:
a computer readable medium having computer readable program code means embodied therein for causing a memory-based parallel Pseudo-random Number (PN) generator to generate a PN code sequence, the computer readable program code means in said article of manufacture comprising:
computer readable code means for producing a PN code sequence having a predetermined length;
computer readable code means for dividing the PN code sequence into L segments, wherein at least one of the L segments has a length less than other segments;
computer readable code means for distributing the L segments into an array of L digital memories respectively;
computer readable code means for outputting data from each of the L digital memories in parallel at a selected rate to form a parallel output;
computer readable code means for substituting at least one element of the PN code from an element-substitution cache in place of the output of the L digital memories to compensate for the at least one segment having the length less than the other segments to provide a continuous PN code output; and
computer readable code means for serializing the parallel output of the L digital memories to output the PN code at L times the selected rate.

* * * * *